Sept. 29, 1959 M. BOYER 2,905,963
LEAF VACUUM COLLECTOR AND BURNER
Filed July 1, 1957 2 Sheets-Sheet 2

Martin Boyer
INVENTOR.

BY *Clarence A. O'Brien*
*and Harvey B. Jacobson*
Attorneys

United States Patent Office 2,905,963
Patented Sept. 29, 1959

2,905,963

LEAF VACUUM COLLECTOR AND BURNER

Martin Boyer, Lowry, Minn.

Application July 1, 1957, Serial No. 668,968

3 Claims. (Cl. 15—339)

This invention relates to a leaf vacuum collector and burner.

An object of the invention is to provide a device for accumulating leaves in bags or burning leaves or other burnable trash in a burner for this purpose.

The invention is capable of being embodied in a machine adapted to be guided and/or propelled by a walking attendant or a machine which is adapted to be attached to large machines for the purpose of taking up hay and deliver this hay to the baler, by vacuum. The same principles hold good for taking up grain for combines or other harvesters, etc. In attaching by machine to other types of equipment, the machine will still maintain its function of collecting leaves in a bag for this purpose, and burning leaves or other burnable trash. For inside cleaning up like in halls, hatchery, and the like an electric motor is used, and the dust bag for this purpose has a large flap to open, when the bag is to be emptied.

A further object of the invention is to provide a machine for gathering and burning leaves or other burnable matter, the machine having an inlet chute through which the leaves are pulled by a suction blower. The leaves are propelled into a burn chamber by the blower, wherein they are consumed and the residue collected in a bag of a flexible or inflexible nature.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a sectional view of the leaf residue bag and taken on the line 4—4 of Figure 1;

Figure 5 is an elevational view of the rear part of the structure in Figure 4; and Figure 6 is a fragmentary elevational view of a detail of the bag construction.

Figure 1:
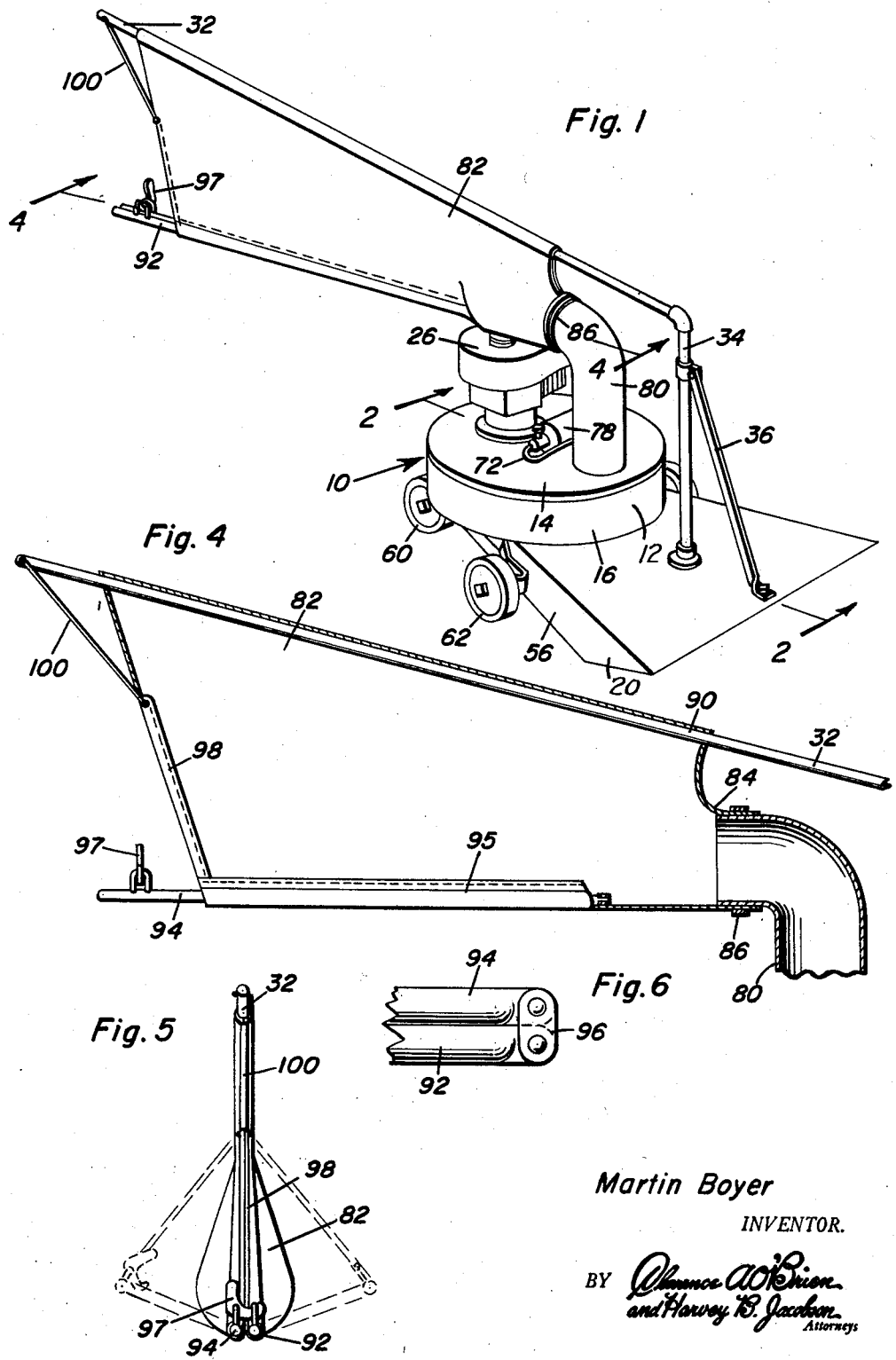
Figure 1 is a perspective view of a machine constructed in accordance with the invention.

In the accompanying drawings there is a leaf gathering and burning machine 10 which is constructed to exemplify the principles of the invention. The machine is made of a machine housing 12 having a top wall 14 and a cylindrical side wall 16. Bottom wall 18 is attached to the lower part of the housing 12 and constitutes the top wall of leaf and/or trash inlet chute 20. Spacers 22 are disposed on the wall 18 assuring that the circular wall 24 in housing 12 will remain centered properly at all times.

A motor 26, for example an internal combustion engine, is mounted on the wall 14 and is adapted to actuate shaft 28 which passes through a hole 30 in wall 14. Standard motor controls are to be used with the motor 26 and in the embodiments of the invention that are to be propelled or at least guided by a walking attendant, these controls may be accessible at the motor only or at the end of the handle 32. Support 34 is attached to handle 32 and to the top of wall 18. Brace 36 attaches diagonally between support 34 and the wall 18. This firmly braces the entire handle assembly.

Blower 40 is mounted within the confines of cylindrical wall 24 and includes a schematically represented impeller 42 attached to shaft 28. An air inlet and leaf opening 44 is formed in wall 18 and is in registry with the impeller 40.

Figure 2:
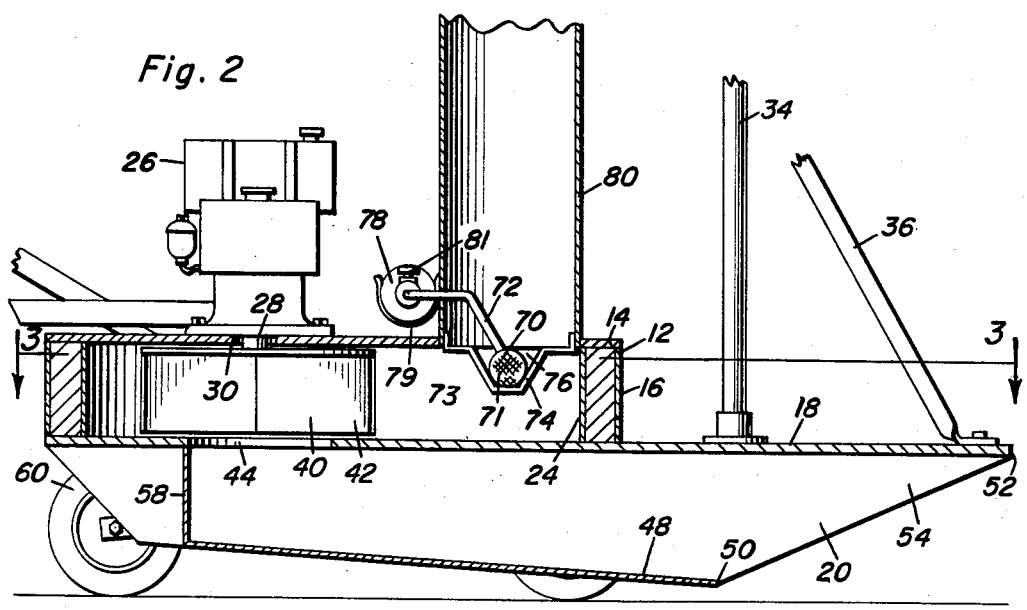
Figure 2 is a longitudinal sectional view of the machine taken approximately on the line 2—2 of Figure 1.
Figure 3:
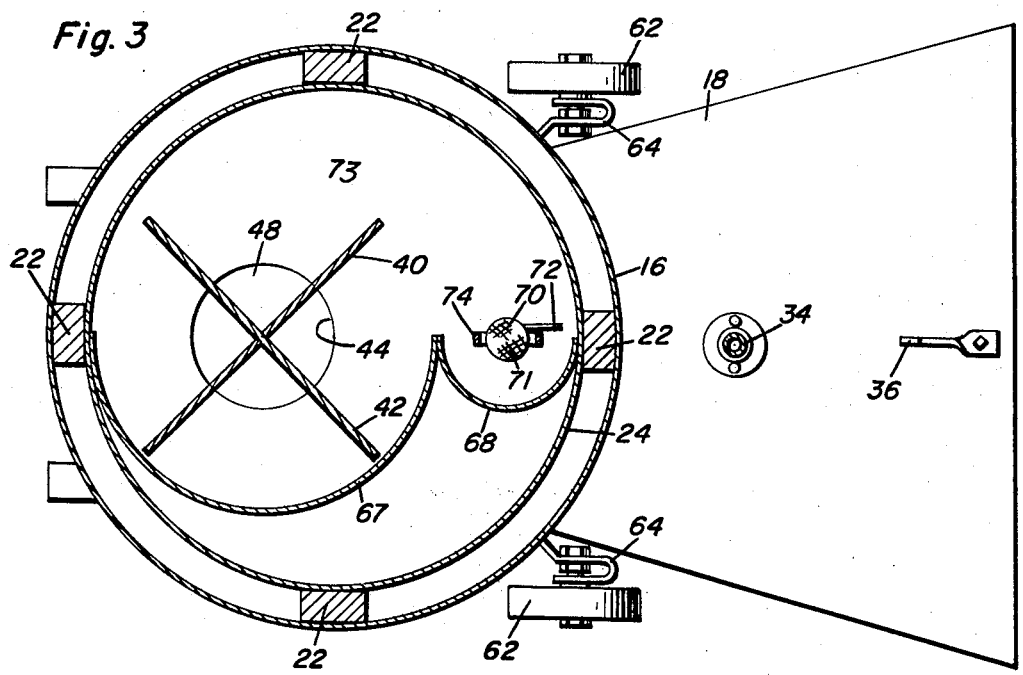
Figure 3 is a sectional view taken on the line 3—3 of Figure 2.

Chute 20 has a bottom wall 48 whose front edge 50 is considerably farther back than the front edge 52 of wall 18. Side walls 54 and 56 of the scoop have tapered forward edges extending from edges 50 and 52 and to a back wall 58 (Figure 2). The back wall is slightly behind opening 44. Rear extensions of side walls 54 and 56 support brackets that have a pair of wheels 60 mounted for rotation on them. Front wheels 62 are carried by mounting brackets 64, the latter secured to the sides of chute 20.

Two semi-circular baffles 67 and 68 are disposed in the housing 12 and within the cylindrical wall 24. Baffle 67 extends partially around the periphery of the blower while baffle 68 surrounds burner 70. The two semi-cylindrical baffles 67 and 68 enclose a chamber 73 in which blower 40 and burner 70 are accommodated. Burner 70 is constructed of a wick 71 which may be in the shape of a ball, and which is fed by fuel line 72 which is attached to the wick. Mounting bracket 74 located in opening 76 in wall 14, supports the wick. Tank 78 having a source of liquid or gaseous fuel under pressure, is mounted on a bracket 79 on the outside of chimney 80. Fuel line 72 extends from a valve 81 on tank 78 after passing through an opening in chimney 80.

Chimney 80 is in the form of a stove pipe having an elbow at its upper end and having its lower open end in registry with the opening 76. Leaf bag or receptacle 82 is supported by handle 32 and has an inlet neck 84 fitted over the end of the elbow on the chimney 80. Band 86 holds the neck firmly attached to the chimney elbow.

In the illustrated form of the invention the leaf bag or receptacle 82 is flexible and carried by the handle 32, although both of these features may be altered. The leaf bag may be in the form of a rigid receptacle, for example made of expanded metal, and fitted directly on the wall 14 or to a short length of chimney pipe. In any event, the illustrated receptacle 82 has an elongated hem 90 through which the handle 32 is passed in order to support the leaf receptacle. Since the receptacle is made of flexible material there is a fullness in the lower part of the receptacle allowing the receptacle to open (see Figure 5) when blower 40 is set into operation. The opening of the receptacle is controlled by two rods 92 and 94 located in hems 95 at the lower edges of the receptacle. The inner ends of rods 92 and 94 (Figure 6) are pivoted together such as by a single pivot pin extending through both of the inner ends of the rods or by a link 96 and two pivot pins. The outer ends of the rods have latch 97 connected to them. By opening the latch and spreading rods 92 and 94 the contents of the bag or receptacle 82 may be emptied. Reinforcing seams 98 are at the rear edges of the bag and the bag is at least partially supported by string 100 which extends from grommets at the upper edges of hems 98 to the outer extremity of handle 32.

In use, when the machine is to be under the control of a walking attendant, the firepot is heated by lighting the wick 71. Blower 40 is set into operation by motor 26. The machine 10 may be self-propelled by the motor or pushed by the attendant. In either case the blower 40 draws leaves, burnable trash, etc. into chute 20, through opening 40 and into chamber 73. The force of the air stream propels the leaves and other matter into the combustion chamber part of chamber 73 and chimney 80 which is defined as being adjacent to the burner 70.

The residue from the burnt leaves the trash passes through chimney 80 and into receptacle 82 where it is accumulated.

When the principles of the invention are practiced with another piece of equipment, for example the combines, harvester, etc. the machine is simply attached to a convenient part of the chassis or frame of the selected machine and functions in the same manner as if controlled by a walking attendant.

In order to accumulate trash, leaves, etc. without burning them, the fire is not used. This applies whether the machine is under the control of a walking attendant or whether the machine is used as an attachment for a larger piece of equipment. Of course, in collecting hay, grain etc. no fire will be used because this might set the whole field on fire. When used for inside cleaning, an electric motor and large bag will be used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a machine for gathering leaves, a housing, a chamber in said housing, a wall defining the outer edges of said chamber, a baffle partially separating said chamber into two compartments, a blower in a first of said compartments, said first compartment having an inlet, a burner in the second of said compartments, said compartments being in registry with each other and said burner being on the downstream side of the blower, an inlet chute attached to said housing and being in registry with the inlet of said first compartment, said chute having an upper wall, a portion of said upper wall constituting the bottom of said chamber, said bottom of said chamber having said inlet therein, a bottom wall and side walls attached to the upper wall of said chute, and said chute having a beveled inlet opening for the material that is collected by said chute.

2. In a machine for gathering leaves, a housing, a chamber in said housing, a wall defining the outer edges of said chamber, a baffle partially separating said chamber into two compartments, a blower in a first of said compartments, said first compartment having an inlet, a burner in the second of said compartments, said compartments being in registry with each other and said burner being on the downstream side of the blower, an inlet chute attached to said housing and being in registry with the inlet of said first compartment, said chute having an upper wall, a portion of said upper wall constituting the bottom of said chamber, said bottom of said chamber having said inlet therein, a bottom wall and side walls attached to the upper wall of said chute, said chute having a beveled inlet opening for the material that is collected by said chute, a chimney, said second compartment having an opening in its top wall within which said burner is located, said chimney being in registry with the last mentioned opening, and a receptacle attached to said chimney within which to accumulate the products of combustion.

3. The machine for gathering leaves of claim 1 wherein said burner includes a burner element, a mounting bracket supporting said burner element in said chamber, a fuel line connected to said burner element, and a source of fuel connected with said fuel line to furnish said burner element with fuel.

References Cited in the file of this patent

UNITED STATES PATENTS

| | | |
|---|---|---|
| 484,191 | Furnas | Oct. 11, 1892 |
| 1,894,884 | Page | Jan. 17, 1933 |
| 2,244,375 | Schotz | June 3, 1941 |
| 2,590,734 | Strong | Mar. 25, 1952 |
| 2,661,493 | Joy | Dec. 8, 1953 |
| 2,700,863 | Etem | Feb. 1, 1955 |
| 2,772,438 | Diaz | Dec. 4, 1956 |